April 9, 1929.  A. M. DUPERU  1,708,362
REGENERATION OF KIESELGUHR
Filed Oct. 25, 1926
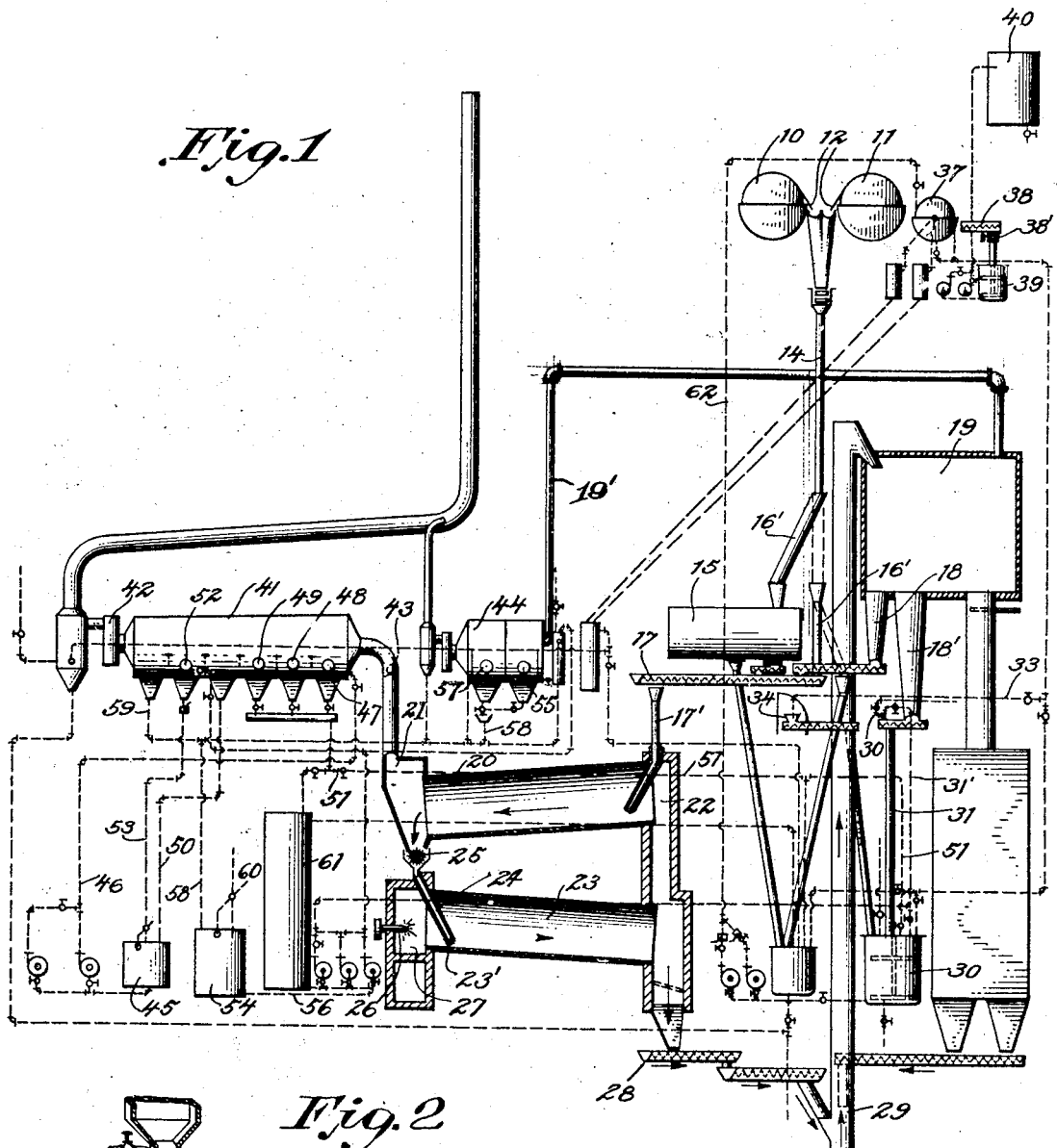
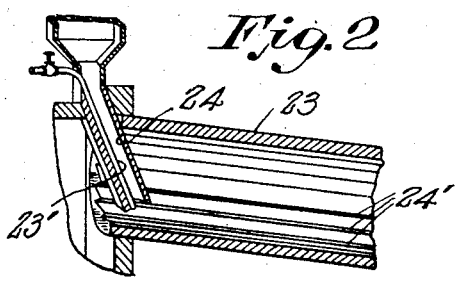
INVENTOR.
Alphonse M. Duperu
BY
ATTORNEYS.

Patented Apr. 9, 1929.

1,708,362

UNITED STATES PATENT OFFICE.

ALPHONSE M. DUPERU, OF CROCKETT, CALIFORNIA.

REGENERATION OF KIESELGUHR.

Application filed October 25, 1926. Serial No. 143,888.

This invention relates to the regeneration of kieselguhr used as a filtering aid in filtration of liquids.

It is common practice in various manufacturing processes to use a filter aid in connection with a liquor to be filtered, and which liquor carries colloids and other foreign substances which can only be removed by means of a relatively compact filter bed within a suitable filtering apparatus, and through which the liquor is passed. This is particularly so in the manufacture and refining of sugar in which a substance known as kieselguhr or diatomaceous earth is commonly used as a filter aid. This material is mixed with the sugar solution and is afterwards removed when the solution is passed through a filter, the filter aid at the same time gathering and carrying the gums, mineral matter and other impurities. In plants when large quantities of liquids are filtered, it is necessary to use a proportionately large amount of kieselguhr.

It is the principal object of the present invention to provide a method and means for regenerating the kieselguhr so that it may be repeatedly used, thereby materially lessening the filtration cost, and minimizing the kieselguhr supply problem.

The present invention contemplates the use of mixing tanks, within which kieselguhr is mixed with the liquids and from which tanks said mixture is carried to and passed through filters, separating the clear liquor from the kieselguhr and impurities in any one of the various forms of filters. It further contemplates removing this kieselguhr in the form of mud either from the original filters or by refiltration after mixing with water, followed by regeneration of this kieselguhr by heating it in a kiln within which the gums and other foreign substances are burned off from the particles of kieselguhr. The invention further contemplates the recovery of this regenerated kieselguhr, either as material that has passed completely through the kiln or as dust recovered from the gases leaving the kiln and also, when desirable, the washing of this recovered kieselguhr to remove the soluble salts.

This invention is illustrated by way of example in the accompanying drawing, in which:

Figure 1 is a view in elevation indicating the apparatus with which the present invention is concerned, and more particularly showing the flow of liquor, kieselguhr, and other materials through the apparatus, and Fig. 2 is a detail view showing the construction and arrangement of certain parts of the lower kiln.

Referring more particularly to the drawing, 10 and 11 indicate two rotary filters of the type generally known as a continuous filter, although it will be understood that various other types of filters might be used if desired. These filters are equipped with the usual scrapers 12 which remove the "cake" of kieselguhr and deliver it to a gravity feed chute 14. This material which is in the form of spent kieselguhr is then passed downwardly through a storage tank 15 or to a feed-pipe 16, this delivery being controlled by the turngate under the storage tank 15, or occasionally the feed pipe 16 delivering the moist "cake" to a scroll mingler 17. This mingler in reality is a scroll conveyor within which the moist kieselguhr "cake" is broken up and there mixed with dry kieselguhr delivered through feed pipes 18 from a storage bin 19. This produces a moist "mealy" mass.

The feed of dry kieselguhr to the mingler is regulated by a variable speed scroll at the discharge of the bin 19, the amount being so regulated as to give a "cake" of the desired consistency. The feed of wet cake is regulated by the turngate from the storage tank so that the flow of kieselguhr through the apparatus will be uniform and continuous, the speed being dependent on the amont of used kieselguhr "cake" it is required to handle.

The mingler communicates with a feed nozzle 17' by which the mixture of moist kieselguhr "cake" and dry regenerated kieselguhr is delivered to a dryer 20.

Long experimentation has proved that the regeneration of kieselguhr by burning the organic matter cannot be easily brought about directly from the moist kieselguhr, as the heat of the kiln will cause it to be baked in large balls, so that the outer surface of the balls of kieselguhr will be hardened and possibly calcined, while the center of these masses of kieselguhr will remain undried, or at least not rid of their associated extraneous material.

It is only by a proper mixture of regenerated dry kieselguhr with the disintegrated moist kieselguhr that a thorough and uniform regeneration of the kieselguhr has been brought about, the proportions of dry and moist materials controlling the consistency of the mixture in the mingler and also the state of division of the material in the dryer.

The mixed kieselguhr thus treated is then passed to the dryer 20, through which it travels. This dryer is in the form of a rotary drum inclined so that the kieselguhr will have an end to end travel therein. The lower end of the drum is in communication with a flue 21, while the higher end of the drum and the one to which the kieselguhr is delivered is in communication with a hot air duct 22 leading from the rotary kiln 23. This kiln is inclined in an opposite direction from the dryer and its highest end is in communication with the lowest end of the dryer through a delivery chute 24.

Interposed between the chute 24 and the dryer 20 is a suitable pin wheel 25, or other suitable disintegrating means, between which the kieselguhr passes, and by which the agglomerate masses of kieselguhr are broken up and made of suitable size.

From the pin wheel 25, the dried mixture passes into feed pipe 24, which discharges into the extreme front end of the lower kiln 23. The kiln is a steel drum similar in size to the drier, and rotates at a slow rate of speed. It is also equipped with a monolithic refractory lining. Flights 24' in this drum are constructed of the same material as the lining, being installed as a part of the lining and acting to agitate the material. An air jet is provided near the end of the feed pipe 24 by means of an air pipe 23'. (See Fig. 2.) This jet of air separates the particles and insures that the organic matter is more thoroughly burned from them.

The heat for burning is supplied by any ordinary type of oil burner 26 which is here shown as located in a brick fire box 27 at the front end of the kiln. The flame burns inside the kiln and comes into direct contact with the kieselguhr as it falls from the flights 24' of the rotary kiln. The treatment of the kieselguhr in the kiln is performed by parallel current burning, the kieselguhr passing through the kiln in about thirty minutes.

The temperature in the kiln is regulated so that the kieselguhr will be heated to a degree at which it is white or just slightly gray when it leaves the kiln. This results in the burning off of all of the organic matter, the only impurities remaining being a small amount of carbon which gives the grayish cast, and the inorganic salts which require removal by washing. Treating the kieselguhr to secure this type of product is found to give the most satisfactory results. It is, however, possible to secure usable material which ranges in appearance from a very dark gray (underburned) to a reddish cast (overburned). Experience has demonstrated, however, that overburned material is much coarser in texture than the slightly gray material and contains a comparatively large amount of grit which is objectionable because of the rapid settling qualities when mixed to a sludge, and also because of lack of value as an aid to filtration. The very dark gray material also develops an objectionable feature, namely, that the heat retained in this material after burning is sufficient to produce combustion of the large quantity of carbon present. This combustion takes place to sufficient extent to form abnormal quantity of gases while passing through the apparatus conveying it from the kiln. These gases form a pressure within the apparatus and as they escape they cause the loss of large quantities of dust. The draft for the kiln is produced by a fan which is used in connection with the dust collector, the amount of draft being regulated by a suitable damper in the flue.

From the kiln the calcined kieselguhr is discharged into a covered scroll conveyor 28 of suitable capacity, which carries it to a chain bucket elevator 29. This elevator discharges into the closed storage bin 19. The bin is equipped with two feed scroll hoppers, 18 and 18' respectively. One of these hoppers 18 supplies the variable feed scroll which furnishes the mingler with regenerated material to mix with the mud discharged from the filters 10 and 11. The hopper 18' supplies a feed scroll by which the regenerated material is drawn off and is mixed with water which is laden with dust recovered in the dust collector system of the kiln. The bin 19 is also equipped with a vent pipe 19' connected with a dust collector.

Due to the lightness in the weight of the dried kieselguhr, amounts varying from 25 to 75 per cent pass from the kiln and dryer as dust and must be recovered. The dust water passing through pipe 30 is added to the regenerated kieselguhr drawn from the bin for use in the filtration process, is introduced at the top of a vertical pipe (31) just below the discharge of the scroll. A mixture of the calcined kieselguhr and water is formed as it flows down through the pipe. This pipe discharges into a mixing tank 30, which is equipped with rotating arms for agitation of the mixture.

To this mixing tank sufficient fresh kieselguhr is added, as described hereinafter, to make up any deficit of regenerated material which is necessary for the filter requirements. The density of the sludge in this tank is generally maintained between 25° and 35° Brix, hot. This sludge is pumped up to a rotary filter 37 where the greater portion of the kieselguhr is filtered out and washed with hot water. A portion of the sludge overflows from the filter in pipe 33 to the hopper 34 where it is used to wash the added fresh kieselguhr down into the mixing tank 30.

The cake from the filter is discharged into a trough 38 from which it passes through the turngate 38' into a mixing tank 39 where it is mixed with raw melt liquor to make a slurry. From this tank the slurry is pumped into a storage supply tank 40 and from there it is distributed as desired, the quantity required being measured by individual calibrated weirs. This slurry of cake and liquor is maintained in an arbitary but definite proportion, a suitable proportion being one-half pound of kieselguhr to one gallon of liquor.

Returning to the process of regeneration described in the foregoing, the hot dust-laden gases leaving the drier 20 pass into a horizontal rotary-spray type dust collector 41. The gases are drawn from the drier by the aid of a fan 42, located at the discharge end of the dust collector, the desired suction being regulated by a damper 43 in the flue between the drier and the dust collector.

The gases enter the collector at one end and pass out through the other, passing through four sprays in the collector. These sprays are produced by four rotors rapidly revolving in the basins of water so that they throw up mists consisting of fine drops of water. A baffle, extending from the top of the dust collector about 2/3 of the way down to the water level, is placed in front of each rotor, as shown in the drawing, so that the gases are directed toward the denser portions of the sprays. As the gases pass through these sprays nearly all of the dust is caught in the droplets of water and recovered. The residual gases then pass out through the fan to a stack 43 and to the atmosphere.

In addition to the main dust collector, a secondary collector 44 containing only two sprays, is used to collect the dust from various sources, such as the hood under which fresh kieselguhr is emptied out of the bags, the vent from the storage bin and the seal rings of the kiln. While this collector is not essential to the operation of the plant, it is a great aid to cleanliness and minimizes losses.

The circulation of water in the dust collecting system is as follows:

Circulating dust water is pumped along a pipe 46 from circulating tank 45 into the basin of the first spray 47 of the main collector, overflows to the second spray 48 and then to the third spray 42, from which basin it overflows back to the circulating tank in pipe 50. Sufficient water is drawn off from the bottom of each of these three basins in pipe 51 to supply the dust water necessary for mixing with the regenerated kieselguhr in mixing tank 30, as described later. The resulting deficiency of water is made up by drawing water into the circulating tank 45 from the basin of the fourth rotor 52, the amount drawn off being regulated by a float valve in said circulating tank. This water is drawn off in pipe 53.

Another circulating system supplies water for the secondary dust collector 44 and also for the fourth rotor 52 of the main collector. In this system water is circulated from the secondary circulating tank 54 to the basin of the first rotor 55 of the secondary collector, along pipe 56, and overflows to the second spray 57 from which it overflows back to the circulating tank. To prevent the basins from filling up with kieselguhr a small amount of water is drawn off from each basin and run back into the circulating tank through a branch of pipe 56.

A branch of the same pipe line 56 that supplies the circulating water to the secondary dust collector supplies water to the basin of the fourth rotor 52 of the main collector. Part of this water overflows the basin and is returned to the secondary circulating tank through pipe 59. A drain at the bottom of this rotor basin is connected with the float valve in the main circulating tank 45 to maintain a constant level in said tank and thereby make up the above mentioned deficiency in the main circulating system.

This drawing off of water from the secondary to the main circulating system creates a deficiency of water in the secondary system. This is made up by the addition of fresh water to the secondary circulating tank, the quantity being regulated by a float valve 60.

The fresh make-up water is added at float valve 60 to the secondary circulating tank 54 and circulates to the secondary collector and to the fourth rotor basin 52 of the main collector 41 and back to the tanks 45 and 54. From this rotor basin 52 a portion of the water, with its accumulated kieselguhr is drawn off into the circulating tank 45 of the main dust collector 41. From this tank the water circulates to the first three sprays of the main collector 41 thereby accumulating a further concentration of kieselguhr, which eventually is drawn off. In this way all of the recovered dust is brought together so that it can be handled as one mass.

This dust water drawn off from the first three rotor basins of the main dust collector 41 is run to the surge tank 61, the quantity being hand regulated so as to maintain approximately a constant level in said surge tank. From this tank the dust water is pumped as required to the top of the vertical pipe 31 to be mixed with the regenerated kieselguhr in mixing tank 30. It will then be pumped to the filter 37 where the kieselguhr will be separated and washed previous to re-using Thus it will be seen that by the method of treating used kieselguhr, or like filter aids, after they have been used in a filtration operation and have gathered organic matter, that it is possible to thoroughly separate the kieselguhr from the organic matter while insuring that the kieselguhr may be handled on a commercial scale and that a finely divided, thoroughly regenerated filter aid will be produced from the used kieselguhr, during which process the dust will be efficiently recovered and a regenerated product will be made at a satisfactory low cost for its treatment.

It may also be desirable to mix other elements with the kieselguhr before drying, after drying, or after burning. Such, for example, as inorgaic salts and the like, and it will be understood that the present invention covers the admixture of the desired additional materials with the kieselguhr at any point in the process without departing from the spirit of the invention.

While I have shown the preferred method of obtaining the regeneration of kieselguhr and a desired apparatus for carrying out this method by way of example, it is to be understood that various changes might be made in the steps of the method and that various changes might be made in the combination, construction and arrangement of the parts of the apparatus without departing from the spirit of the invention as claimed.

Having thus described my invention, what I claim and desire to secure by Letters Patent is—

1. A method of regenerating used kieselguhr and the like, which consists in thoroughly mixing the moist used kieselguhr with finely divided dry kieselguhr, thereafter driving off the moisture from the mixture and then burning the associated organic material from the particles of used kieselguhr.

2. A method of regenerating moist and used kieselguhr cake, which consists in thoroughly mixing said cake with finely divided dry kieselguhr and thereafter passing said mixture through drying means within which the moisture will be driven off from the mixture, then treating the mixture to put it in a finely divided condition and thereafter burning off the associated organic matter from the particles of kieselguhr in the mixture.

3. A method of regenerating moist kieselguhr cake which has been used as a filter aid, which method consists in thoroughly mixing the cake with finely divided dry kieselguhr to give it a "mealy" consistency, thereafter passing the mixture through a drying kiln in which the moisture is driven off from the kieselguhr, then passing said dried kieselguhr through means to reduce it in fineness, thereafter delivering it to a burning kiln, in which it is agitated by air and in which kiln the associated organic matter is burned from the kieselguhr particles, then recovering the dust from the drying and burning kilns by gathering the dust in water and thereafter mixing the solution carrying the suspension of dust in water with dry recovered kieselguhr from the kilns.

4. An apparatus of the class described, comprising means for breaking up moist kieselguhr cake and mixing it with dry kieselguhr, a kiln in which said mixture is dried, means for reducing the fineness of said dried mixture after leaving the kiln, and a second kiln within which associated organic matter is burned from the particles of kieselguhr.

5. An apparatus of the class described, comprising means for breaking up moist kieselguhr cake and mixing it with dry kieselguhr, a kiln in which said mixture is dried, means for reducing the fineness of said dried mixture after leaving the kiln, and a second kiln within which associated organic matter is burned from the particles of kieselguhr, a dust-collecting system associated with the two kilns, and means for forming a suspension of the dust in water, said suspension thereafter being mixed with dry calcined kieselguhr from the second kiln.

6. A method of regenerating moist kieselguhr cake which has been used as a filter aid, which method consists in thoroughly mixing the cake with finely divided dry kieselguhr to give it a "mealy" consistency, thereafter passing the mixture through a drying kiln in which the moisture is driven off from the kieselguhr, then passing said dried kieselguhr through means to reduce it in fineness, thereafter delivering it to a burning kiln, in which it is agitated by air and in which kiln the associated organic matter is burned from the kieselguhr particles, then recovering the dust from the drying and burning kilns by gathering the dust in water and thereafter mixing the water carrying the suspended dust with dry, calcined kieselguhr from the calcining kiln and thereafter filtering the mixture by means of which the kieselguhr may be separated from the surplus water and washed previous to reuse.

7. A method of regenerating used kieselguhr by burning, one step of which is to mix dry kieselguhr with the wet used kieselguhr to give a desired consistency to the mass prior to burning.

ALPHONSE M. DUPERU.